Patented July 5, 1927.

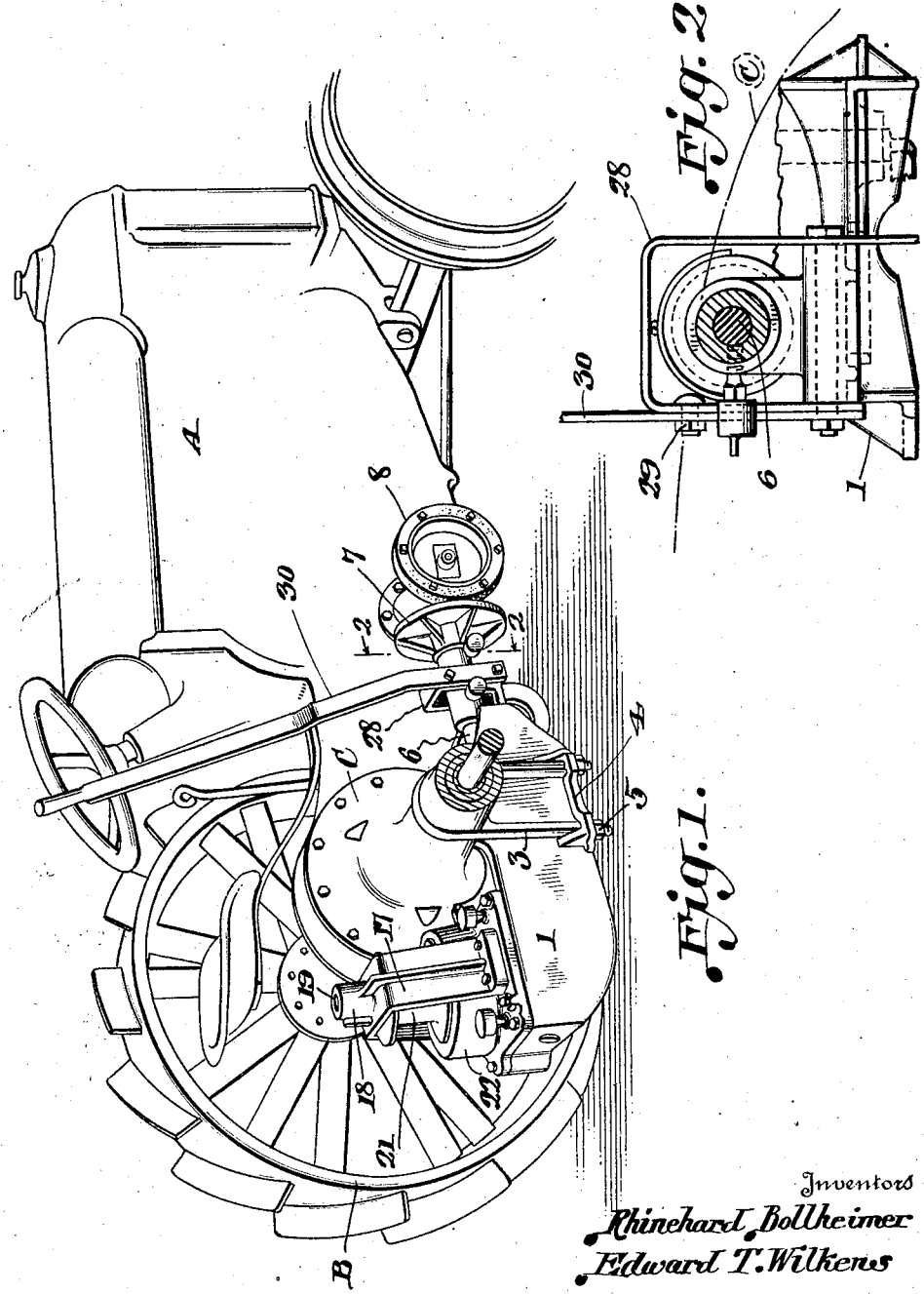

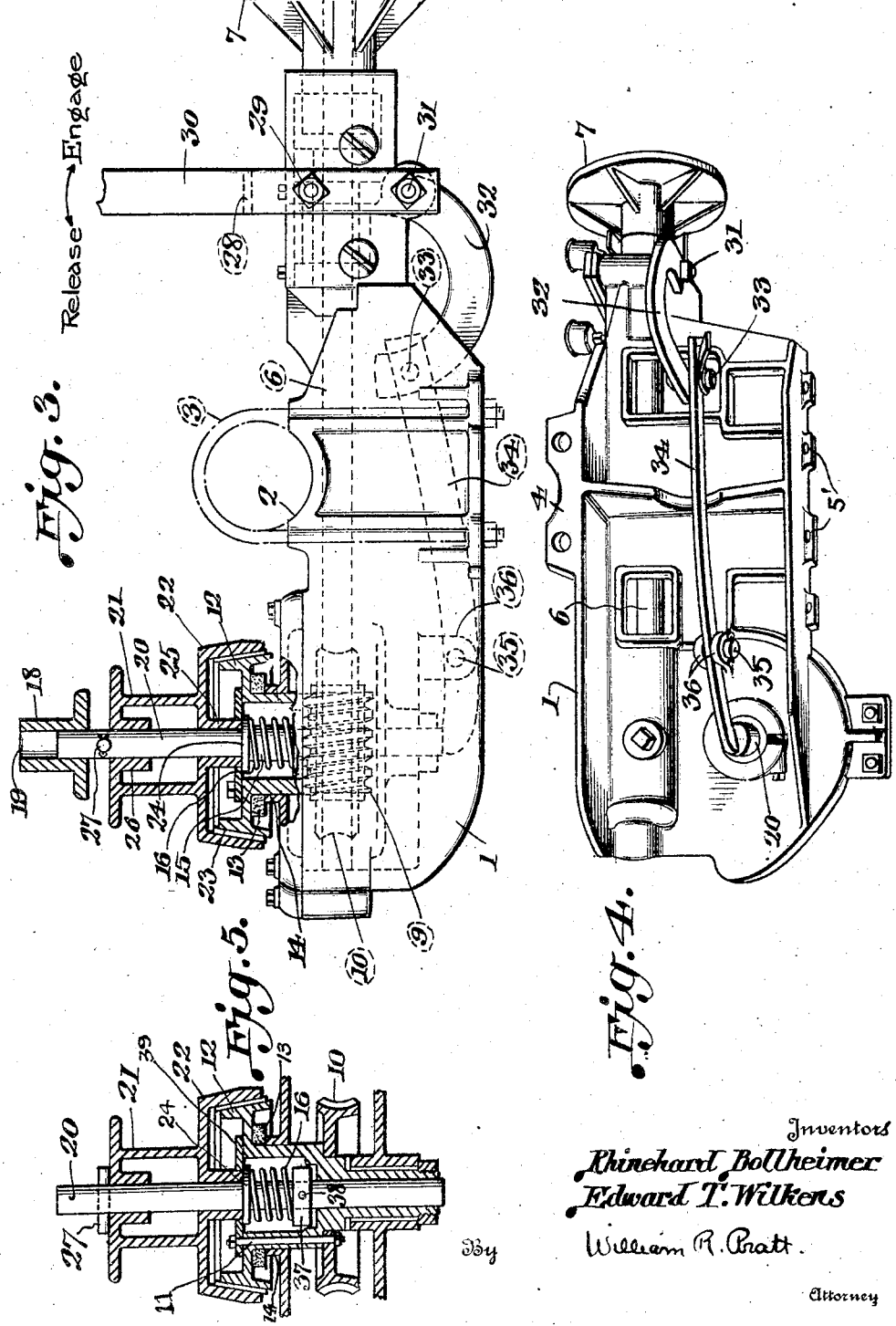

1,634,446

UNITED STATES PATENT OFFICE.

RHINEHARD BOLLHEIMER AND EDWARD T. WILKENS, OF FORT LORAMIE, OHIO.

TRACTOR ATTACHMENT.

Application filed January 9, 1926. Serial No. 80,197.

Our invention relates to an attachment primarily for a Fordson tractor for the purpose of driving a winding drum upon which a cable is wound for the purpose of operating a grader or scraper or similar device. It may be employed with advantage in connection with a wheel grader or scraper of the type shown in our Patent No. 1,460,225, June 26, 1923, or in connection with other graders or scrapers of varying types. It may also be employed in other relations where for any purpose it is desired to use the power of the tractor to wind up a cable upon a drum.

In the drawings:

Figure 1 is a side elevation of a portion of a Fordson tractor with the attachment in operative position.

Figure 2 is a section on the line 2—2 of Figure 1.

Figure 3 is a side elevation of the attachment with parts in section.

Figure 4 is a bottom plan view of the attachment removed from the tractor.

Figure 5 is a vertical section through the clutch mechanism.

The tractor A is provided with the usual rear wheels B and axle housing C. These parts as well as the other elements of the tractor mechanism may be of any old or desired type and are only illustrated to show the operative relation of the invention thereto.

The invention provides a casting 1 which has a circular depression 2 in its upper edge to fit against the under side of the axle housing C and to be held thereto by a U-bolt 3, the ends of which pass through a flange 4 at the lower side of the casting and are held in position by nuts 5. Four cap screws firmly attach this same casting to the differential housing of the tractor as shown at 5'. By this means the whole attachment may be held in operative relation and readily detached from the frame of the tractor.

A shaft 6 is mounted in the supporting casting and is provided adjacent its ends with any desired form of roller bearings and thrust bearing which form no part of the invention and are therefore not illustrated in detail. At one end this shaft 6 carries a friction disk 7 which is adapted to engage the edge of a friction wheel 8 carried by the power shaft of the tractor in which manner the friction disk 7 and the shaft 6 are caused to rotate. Near the other end of the shaft 6 there is rigidly fastened thereon a worm 9 with which meshes a worm gear 10 which is rigidly fastened by bolts 11 to cone casting 12 forming one member of a clutch. Suitable packing 13 may be interposed between the flange of this clutch member and an upstanding flange 14 on the supporting casting 1.

A bracket 17, shown in Figure 1, is attached by bolts to the main casting 1 and has at its upper end a cylindrical member 18 provided with a central opening 19. A shaft 20 extends within the opening 19 downward through a registering opening in the worm gear 10 and reaches nearly to the bottom of the member 1. A cylindrical sleeve 15 surrounds the shaft 20 and bears at its lower end against a collar 37 fast to the shaft 20 by a pin 38. A spring 16 surrounds the sleeve, bears at its lower end against a collar 37 and at its upper end against a collar 24 which engages a plate 39 held in position by the bolts 11. This collar 24 may be omitted if desired and the spring 16 may directly engage the plate 39. Mounted to rotate loosely on the shaft 20 is a winding drum 21 having at its lower edge a downwardly extending and outwardly tapering flange 22 adapted to overlie and inclose the member 12 and to form a clutch member cooperating with said clutch member 12. Interposed clutch lining 23 may be employed. A pin 27 passes through the shaft 20 above the upper flange of the drum 21 so that if the shaft 20 is moved downwardly the drum 21 will be caused to move therewith and the clutch members brought into driving engagement. The shaft itself is moved downward by the spring 16.

Near the friction disk 7 is mounted a bracket 28 on the supporting casting, the form of which is shown more clearly in Figure 2. Pivoted to this bracket on a pivot 29 is a lever 30, the upper end of which extends adjacent to the operator's seat. To the lower end of this lever is attached by a bolt 31 a curved arm 32 which is pivoted at its other end 33 to a lever 34 turning about a pin 35 extending between ears 36 in the casting. The other end of this lever engages in any suitable manner the lower end of the shaft 20.

When the parts are in the Figure 3 position and it is desired to engage the clutch members for effective operation, the lever 30 will be moved forward rocking the arm 32 and moving the right hand end of the lever 34 upwardly and consequently allowing the left hand end and the shaft 20 to move downwardly to bring the clutch members 22 and 12 into effective engagement. The power of the tractor will then operate through the shaft 6, worm 9, worm gear 10, and the clutch to turn the drum 21, thereby winding up any cable which may be attached thereto. When it is desired to release the clutch, the lever 30 is moved in the opposite direction, reversing the operation of the parts, and moving the shaft 20 upwardly, thereby leaving the member 21 free to move so that the clutch members will not be in effective engagement.

It will be observed that the invention constitutes a very simple and efficient attachment which can be applied to a Fordson tractor without any change whatever in the construction thereof. It can be operated at the desire of the operator of the tractor to rotate the drum and wind up a cable thereon. At any time the clutch members may be disengaged to allow the cable to be withdrawn in any desired manner. It is obvious that various details of construction can be widely modified without in any way departing from the spirit of the invention. Various mechanical details are shown in the drawings, such as the oil cups, the bearing attachments, and similar features, which are not described, since they form no part of the invention. Having due regard for such obvious changes and variations, the invention is to be regarded as limited only by the scope of the appended claims.

We claim:

1. An attachment for tractors comprising a supporting frame adapted to be supported on the tractor, a horizontal shaft mounted in said frame, means for driving said shaft, a gear on said shaft, a second gear meshing therewith, a second shaft at right angles to the first on which said second gear freely rotates, a clutch member on said second gear, a winding drum also rotating freely on said second shaft, a clutch member on said drum, and means for moving the second shaft endwise to bring the clutch members into engagement.

2. An attachment for tractors comprising a supporting frame adapted to be supported on the tractor, a horizontal shaft mounted in said frame, means for driving said shaft, a gear on said shaft, a second gear meshing therewith, a second shaft on which said second gear freely rotates, a clutch member on said second gear, a winding drum also rotating freely on said second shaft but moving axially with said shaft, a clutch member on said drum, and means for moving the second shaft longitudinally to engage the two clutch members.

3. An attachment for tractors comprising a supporting frame adapted to be supported on the tractor, a driving shaft mounted on said frame, a gear on said shaft, a second shaft mounted at an angle to the first, a second gear and winding drum both mounted to revolve freely on said second shaft, and provided with cooperating clutch members, the second gear being driven from the first, and means for moving the second shaft endwise to bring the clutch members into engagement.

4. An attachment for tractors comprising a supporting frame adapted to be supported on the tractor, a driving shaft and a winding drum carried by said frame, driving means between the shaft and drum including clutch members, a second shaft on which the drum revolves freely, and means for moving said second shaft endwise and thereby bringing said clutch members into engagement.

5. An attachment for tractors comprising a supporting frame adapted to be supported on the tractor, a shaft mounted in said frame and adapted to be driven from the engine of the tractor, a gear on said shaft, a second gear meshing therewith, a clutch member rigid with said second gear, a winding drum, a second clutch member integral with said drum, a second shaft on which the second gear, clutch members and drum are mounted to turn, and spring means normally tending to engage said clutch members.

6. An attachment for tractors comprising a supporting frame adapted to be supported on the tractor, a shaft mounted in said frame and adapted to be driven from the engine of the tractor, a gear on said shaft, a second gear meshing therewith, a clutch member rigid with said second gear, a winding drum, a second clutch member integral with said drum, a second shaft on which the second gear clutch members and drum are mounted to turn, spring means normally tending to move said shaft endwise and to engage said clutch members, and means for disengaging the clutch members as desired.

In testimony whereof we affix our signatures.

RHINEHARD BOLLHEIMER.
EDWARD T. WILKENS.